United States Patent
Egi et al.

(10) Patent No.: US 9,419,918 B2
(45) Date of Patent: Aug. 16, 2016

(54) NON-TRANSPARENT BRIDGE METHOD AND APPARATUS FOR CONFIGURING HIGH-DIMENSIONAL PCI-EXPRESS NETWORKS

(71) Applicant: Futurewei Technologies, Inc., Plano, TX (US)

(72) Inventors: Norbert Egi, Santa Clara, CA (US); Robert Lasater, Menlo Park, CA (US); Guangyu Shi, Cupertino, CA (US)

(73) Assignee: Futurewei Technologies, Inc., Plano, TX (US)

( * ) Notice: Subject to any disclaimer, the term of this patent is extended or adjusted under 35 U.S.C. 154(b) by 60 days.

(21) Appl. No.: 14/536,516

(22) Filed: Nov. 7, 2014

(65) Prior Publication Data

US 2016/0134564 A1     May 12, 2016

(51) Int. Cl.
  *H04L 12/28*   (2006.01)
  *H04L 12/947*  (2013.01)
  *H04L 12/933*  (2013.01)
  *H04L 12/707*  (2013.01)
  *H04L 12/24*   (2006.01)

(52) U.S. Cl.
  CPC .............. *H04L 49/25* (2013.01); *H04L 41/12* (2013.01); *H04L 45/24* (2013.01); *H04L 49/15* (2013.01)

(58) Field of Classification Search
  None
  See application file for complete search history.

(56) References Cited

U.S. PATENT DOCUMENTS

| | | | |
|---|---|---|---|
| 8,429,325 B1 | 4/2013 | Onufryk et al. | |
| 2003/0123461 A1* | 7/2003 | Riley | H04L 12/4625 370/401 |
| 2006/0282603 A1* | 12/2006 | Onufryk | G06F 13/404 710/312 |
| 2009/0164694 A1 | 6/2009 | Talayco et al. | |
| 2009/0198863 A1 | 8/2009 | Gregg | |
| 2011/0202701 A1* | 8/2011 | Maitra | G06F 13/4022 710/308 |
| 2014/0372741 A1* | 12/2014 | Gardiner | G06F 13/4045 713/2 |

FOREIGN PATENT DOCUMENTS

WO   WO-2009120798   10/2009

OTHER PUBLICATIONS

"International Application No. PCT/CN2015/093802, International Search Report mailed Feb. 4, 2016", 11 pgs.

* cited by examiner

*Primary Examiner* — Duc C Ho
(74) *Attorney, Agent, or Firm* — Schwegman Lundberg & Woessner, P.A.

(57) ABSTRACT

The descriptions presented herein include explanation of high-dimensional PCI-Express (PCIe) network implementations. The new approaches can facilitate utilization of an efficient protocol (e.g., PCIe, etc.) while enabling implementation of various characteristics and features (e.g., characteristics and features similar to a fat-tree topology, CLOS topology, 2D and 3D topologies, etc.) that would otherwise not be compatible with the protocol. For example, implementation of alternative paths can be enabled and utilized while maintaining compliance with a protocol (e.g., PCIe, etc.) that would otherwise not be compatible with the use of alternative paths. The alternative paths can facilitate flexible topology implementation and network domain scaling while enabling improved communication latency. In one embodiment, presented systems and methods facilitate utilization of a non-transparent bridge circuit configured as an end-point with respect to communications from at least one device while facilitating transmission of the communications on to at least one other device.

22 Claims, 12 Drawing Sheets

900

910

Receiving in a processing component of the non-transparent bridge circuit a first data packet from a first one of the plurality of switches in the PCIe compliant network, the first data packet includes a first address that is within a first address range associated with the non-transparent bridge circuit in accordance with a PCIe compliant topology.

920

Translating in the processing component the first address to a second address that is within a second range of addresses associated with a second one of the switches included in the plurality of switches in the PCIe compliant network, the translating resulting in a second data packet that includes the second address.

930

Forwarding the second data packet from the processing component to the second switch via a first data path between the first switch and the second switch, bypassing an intervening third switch in a second data path which is part of the PCIe compliant topology, wherein the first data path is at least one hop less than the second data path in the PCIe compliant topology.

Initializing the processor to simulate two end-point devices and establish a link between one of the end-point devices being simulated by the processor and a second switch.

1020

Receiving in a processor a data packet originating from a source end-point device from a first switch.

1030

Translating in the processor a first end-point address associated with the bridge to a second address associated with the second switch.

1040

Forwarding the data packet from the processor to the second switch via a first data path, bypassing an intervening switch in a second data path which is part of an initial tree topology, wherein the second path is greater than one hop in the tree topology.

1110
Configuring an apparatus to be associated with a first address, the first address is considered an end-point address (e.g., by a first device that the apparatus receives information from even though the apparatus forwards the information received from the first device to a second device associated with a second address, etc.).

1120
Configuring the apparatus to be associated with a third address, the third address is considered an end-point address (e.g., by the second device the apparatus receives information from even though the apparatus forwards the information received from the second device to the first device, the first device is associated with a fourth address, etc).

1130
Establishing an address translation capability (e.g., that enables translation between the first address and the second address, and between the third address and fourth address, etc.).

NON-TRANSPARENT BRIDGE METHOD AND APPARATUS FOR CONFIGURING HIGH-DIMENSIONAL PCI-EXPRESS NETWORKS

TECHNICAL FIELD

The present disclosure relates generally to the field of communication and more specifically to the field of network communication.

BACKGROUND

Electronic systems and circuits have made a significant contribution towards the advancement of modern society and are utilized in a number of applications to achieve advantageous results. Numerous electronic technologies such as digital computers, calculators, audio devices, video equipment, and telephone systems facilitate increased productivity and cost reduction in analyzing and communicating data, ideas and trends in most areas of business, science, education and entertainment. Frequently, these activities involve communication of information and data between components and how the information is communicated can impact performance.

There are various traditional communication or interconnection topologies utilized to communicate information (e.g., basic tree, fat-tree, CLOS, 2D or 3D torus, etc.). There are also various protocols used in implementing the topologies (e.g., Peripheral Component Interconnect (PCI), PCI-Express (PCIe), etc.). Some of these protocols may be implemented in relatively simple communication environments or networks. PCIe is one of the most widely used interconnection mechanisms between central processing units (CPUs) and their immediate peripherals. These CPUs and immediate peripherals are typically deployed primarily at a printed circuit board (PCB) level within a single device or enclosure (e.g., a single PC, single server, etc.) and PCIe technology was originally designed as an onboard interconnection technology. Conventional PCIe environments or networks typically have only a single PCIe switch and a relatively few number of nodes (e.g., CPUs and I/O devices). In these limited and confined applications, some conventional PCIe approaches attempt to be a high throughput, low-latency, packet based and switched interconnection technology. However, as a practical matter, the types and complexity of topologies that can be implemented with conventional PCIe approaches are essentially limited (e.g., a small basic tree topology with relatively few levels and end-points, etc).

As the size and complexity of a network increases (e.g., the number of end-points and paths interconnected by the network increases, etc.), conventional basic tree topology and PCI type protocol attempts typically become inefficient and impractical. Traditional basic tree topology and PCI type protocol restrictions typically have constraints that restrict communication operations and path options (e.g., prohibit alternate paths or multiple communication paths between components, etc.) that have adverse impacts in some situations (e.g., the communication paths can become very long with lots of hops, etc.).

FIG. 1 is a block diagram of one example of a conventional attempt at a basic tree topology. As indicated in FIG. 1, there is a single communication path between switch 115 and switch 127 with relatively numerous multiple intervening hops (e.g., to switches 121, 122, 124, etc.) that communications must traverse. As also indicated in FIG. 1, there is a single communication path between end-point 181 and end-point 191 again with numerous multiple intervening hops (e.g., to switches 129, 128, 121, 115, 131, 133, etc.) that communications must traverse. As a practical matter, paths between switches and end-points become too long (e.g., in terms of hops, etc.) and components (e.g., links close to the root, etc.) become overloaded.

Some traditional approaches to network engineering attempt to use other topologies (e.g., fat-tree, CLOS, 2D or 3D torus, etc.). However, there is significant challenges to attempt to build such topologies with the conventional PCIe compatible technology due to the PCIe constraints associated with a basic tree topology and its inability to handle alternate connections.

SUMMARY

Presented systems and methods can facilitate efficient communication. In one embodiment, a PCIe network for communicating information includes a non-transparent bridge circuit, a plurality of switches and a plurality of endpoint devices. The non-transparent bridge circuit comprises: a first network connection, a second network connection, a processing circuit and a memory. The first network connection is connected to a first switch in a first tree branch of the PCIe network and the second network connection is connected to a second switch in a second tree branch of the PCIe network. The non-transparent bridge circuit is assigned a first range of addresses with respect to the first switch and a second range of addresses with respect to the second switch. The processing circuit is configured to: receive a first data packet from the first switch, the first data packet includes a first payload portion and a first destination address that is within the first range of addresses assigned to the non-transparent bridge; translate the first destination address to a first translated destination address, wherein the first translated destination address belongs to an endpoint device in the second tree branch and connected to the second switch; generate a first modified data packet including the first payload portion and the first translated destination address; and forward the first modified data packet to the second switch for delivery to the endpoint device in the second tree branch. Forwarding the modified data packet to the second switch can bypass an intervening third switch in the second branch and remains PCIe compliant.

The processor can also be configured to: receive a second data packet from the second switch, the second data packet includes a second payload portion and a second destination address that is within the second range of addresses assigned to the non-transparent bridge; translate the second destination address to a second translated destination address, wherein the second translated destination address belongs to another endpoint device in the first tree branch and connected to the first switch; generate a modified data packet including the second payload portion and the second translated destination address; and forward the second modified data packet to the first switch for delivery to the endpoint device in the first tree branch. The memory stores information for the processing circuit. The memory can store an address translation table that maps the first destination address to the first translated destination address. A single entry in the address translation table can be utilized to store the first destination address contained in the first data packet. The non-transparent bridge circuit can have a variety of implementations (e.g., a chip, an ASIC, a CPU, etc,) in various configurations (e.g., separate entity, incorporated in one of the plurality of switches, etc.).

In one exemplary implementation, an apparatus (e.g., non-transparent bridge circuit, etc.) participates in a communication process or method. The method is performed in a PCIe compliant network. Data packets are transmitted via a non-transparent bridge circuit in a PCIe compliant network to a plurality of switches and endpoints coupled to the non-transparent bridge circuit. A data packet from a first one of the plurality of switches in the PCIe compliant network is received in a processing component of the non-transparent bridge circuit. The data packet includes a first address that is within one of a pair of address ranges associated with the non-transparent bridge circuit. The pair of address ranges assigned to the non-transparent bridge circuit can be assigned by a PCIe root complex controller (which can consider the pair of address ranges to be end-point address ranges).

The first address is replaced with a second address to form a modified data packet, the second address is associated with a second one of the switches included in the plurality of switches in the PCIe compliant network. The modified data packet is forwarded from the processing component to the second switch via a first data path between the first switch and the second switch. The forwarding can bypass an intervening third switch in a second data path connected to the first one of the plurality of switches and the second one of the plurality of switches. The first data path and second data path enable multi-path routing in the PCIe compliant network In one embodiment, the first data path and second data path enable multi-path routing in the PCIe compliant network. The first data path can be at least one hop less than the second data path in the PCIe compliant network. Mapping can prevent data packets from being transmitted through a loop transmission path formed at least in part by the first data path and the second data path. The first address is mapped to the second address, and the mapping is utilized to translate the first address with the second address. The modified data packet is generated by the replacing of the first address in the data packet with the second address.

It is appreciated the addresses and address ranges can have a variety of configurations. The size of the one of the pair of address ranges can be equal to or larger than the difference between a beginning address and an end address allocated to a plurality of resources coupled to the non-transparent bridge. The size of the one of the pair of address ranges can be equivalent to the sum of addresses allocated to a plurality of resources coupled to the non-transparent bridge. In one exemplary implementation, the second switch is included in the plurality of resources. The length of one of the pair of address ranges can be equivalent to the length of addresses assigned to resources on one communication side of the non-transparent bridge and the length of the of another one of the pair of address ranges can be equivalent to the length of addresses assigned to resources on an opposite communication side of the non-transparent bridge.

In one embodiment, a PCIe compliant network system communicates information though components configured in a topology that includes multiple different paths between two switches. The PCIe compliant network system comprises: a plurality of switch devices coupled together to form a PCIe compliant tree topology with a plurality of branches; a plurality of end point devices that are coupled to the ends of the plurality of branches; and a non-transparent bridge exposed to a first one of the plurality of switches by a first range of addresses assigned to the non-transparent bridge and exposed to a second one of the plurality of switches by a second range of addresses assigned to the non-transparent bridge. The non-transparent bridge communicates information in the PCIe compliant network between the first one of the plurality of switches and second one of the plurality of switches by translating a destination address within the first range of addresses assigned to the non-transparent bridge to a translated destination address associated with a resource coupled to the second one of the plurality of switches and translating a destination addresses within the second range of addresses assigned to the non-transparent bridge to a translated destination address associated with a resource coupled to the first one of the plurality of switches.

The non-transparent bridge circuit comprises: a first network connection, a second network connection, a processor and a memory. The first network connection is connected to the first one of the plurality of switches in a first one of the plurality of branches of the PCIe compliant network and the second network connection is connected to a second one of the plurality of switches in a second one of the plurality of branches of the PCIe compliant network. The processing circuit is configured to: receive a data packet from the first one of the plurality of switches; generate a modified data packet based on results of the translating of the destination address within the first range of addresses; and forward the modified data packet to the second switch for delivery to the resource. The data packet includes a first payload portion and the destination address that is within the first range of addresses assigned to the non-transparent bridge. The modified data packet includes the first payload portion and the translated destination address associated with the resource coupled to the second one of the plurality of switches. The resource can include an end-point device The first range of addresses and the second range of addresses can be assigned by a master root complex circuit that coordinates address assignment to the plurality of switches, the plurality of end points and the non-transparent bridge. The first range of addresses and the second range of addresses can be a pair of address ranges that enable the non-transparent bridge to simulate a pair of end points. The multiple different paths can include transmission connections between the plurality of switches, the plurality of end point devices, and the non-transparent bridge to form a high-dimensional topology that is PCIe compliant. An alternative path in the multiple different paths other than through the non-transparent bridge can be established between the first one of the plurality of switches and the second one of the plurality of switches. The PCIe compliant network system can include a first PCIe compliant network domain comprised of up to 256 nodes that include the first switch and a second PCIe compliant network domain comprised of up to 256 nodes that include the second switch, and the non-transparent bridge can forward the payload portion across a boundary of the first PCIe compliant network domain and the second PCIe compliant network domain in accordance with the translation of the first address to the second address.

BRIEF DESCRIPTION OF THE DRAWINGS

The accompanying drawings, which are incorporated in and form a part of this specification, are included for exemplary illustration of the principles of the present invention and not intended to limit the present invention to the particular implementations illustrated therein. The drawings are not to scale unless otherwise specifically indicated.

FIG. 9 is a block diagram of an exemplary communication process in accordance with one embodiment.

FIG. 10 is a flow chart of an exemplary method for transmitting data packets through a bridge in a PCIe compliant transmission system in accordance with one implementation.

FIG. 11 is flow chart of an exemplary method in accordance with one embodiment.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

The descriptions presented herein include approaches that can facilitate utilization of an efficient protocol (e.g., PCIe, etc.) while enabling implementation of various characteristics and features (e.g., characteristics and features similar to a fat-tree topology, CLOS topology, 2D and 3D topologies, etc.) that would otherwise not be compatible with the protocol. Implementation of alternative paths can be enabled and utilized with a protocol (e.g., PCI, PCIe, etc.) that would otherwise not be compatible with the use of alternative paths. For example, the enablement of both simple interconnections (e.g., similar to a basic tree topology, etc.) and alternative path interconnections (e.g., similar to a fat tree topology, etc.) while remaining compatible with PCIe protocol requirements. In one embodiment, presented systems and methods facilitate utilization of a non-transparent bridge circuit configured as an end-point with respect to communications from at least one device while facilitating transmission of the communications on to at least one other device. Additional explanation of various aspects of the new approaches is set forth in later portions of the detailed description.

Figure 1:
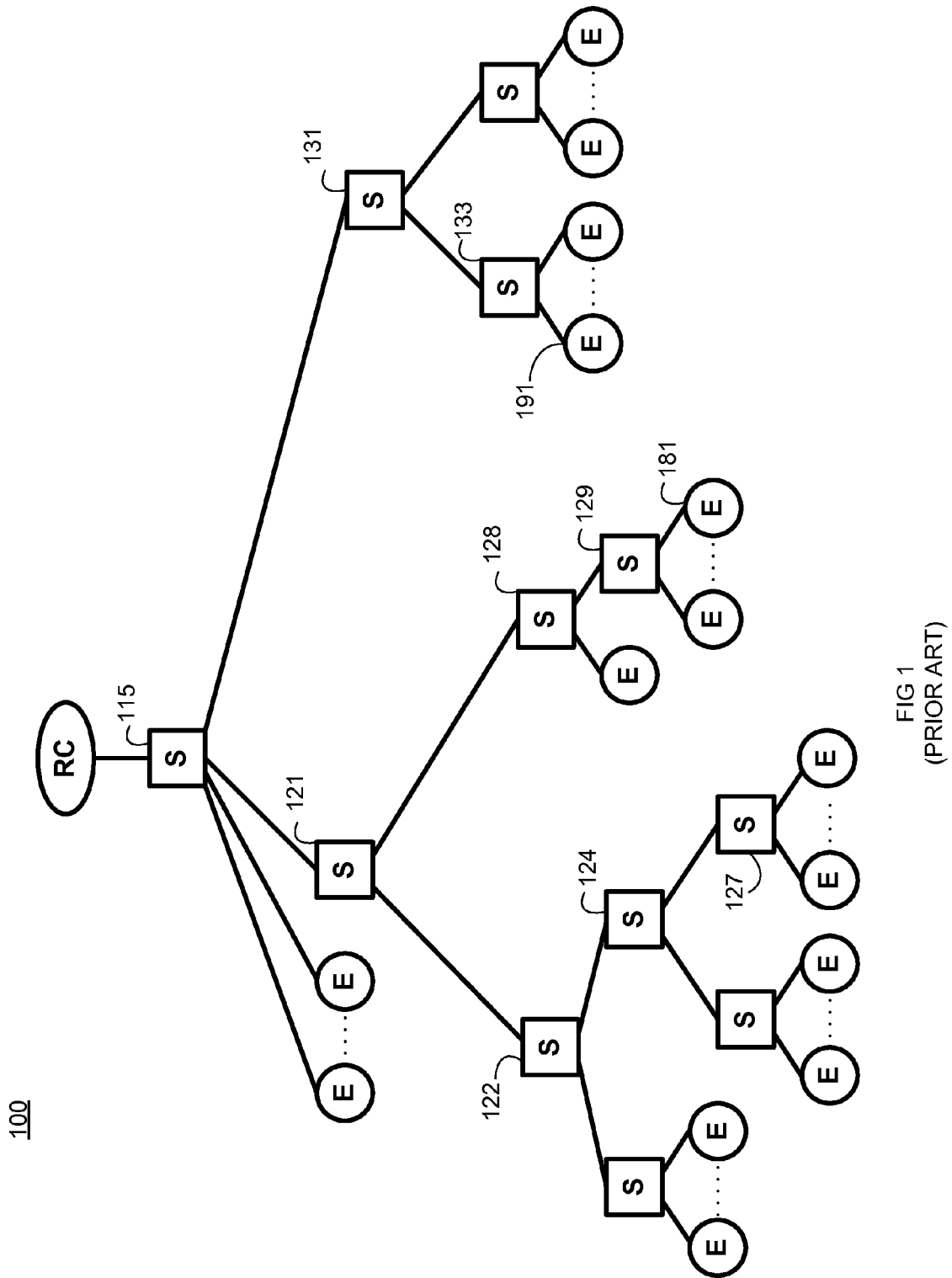
FIG. 1 is a block diagram of one example of a conventional attempt at a basic tree topology.
Figure 2:
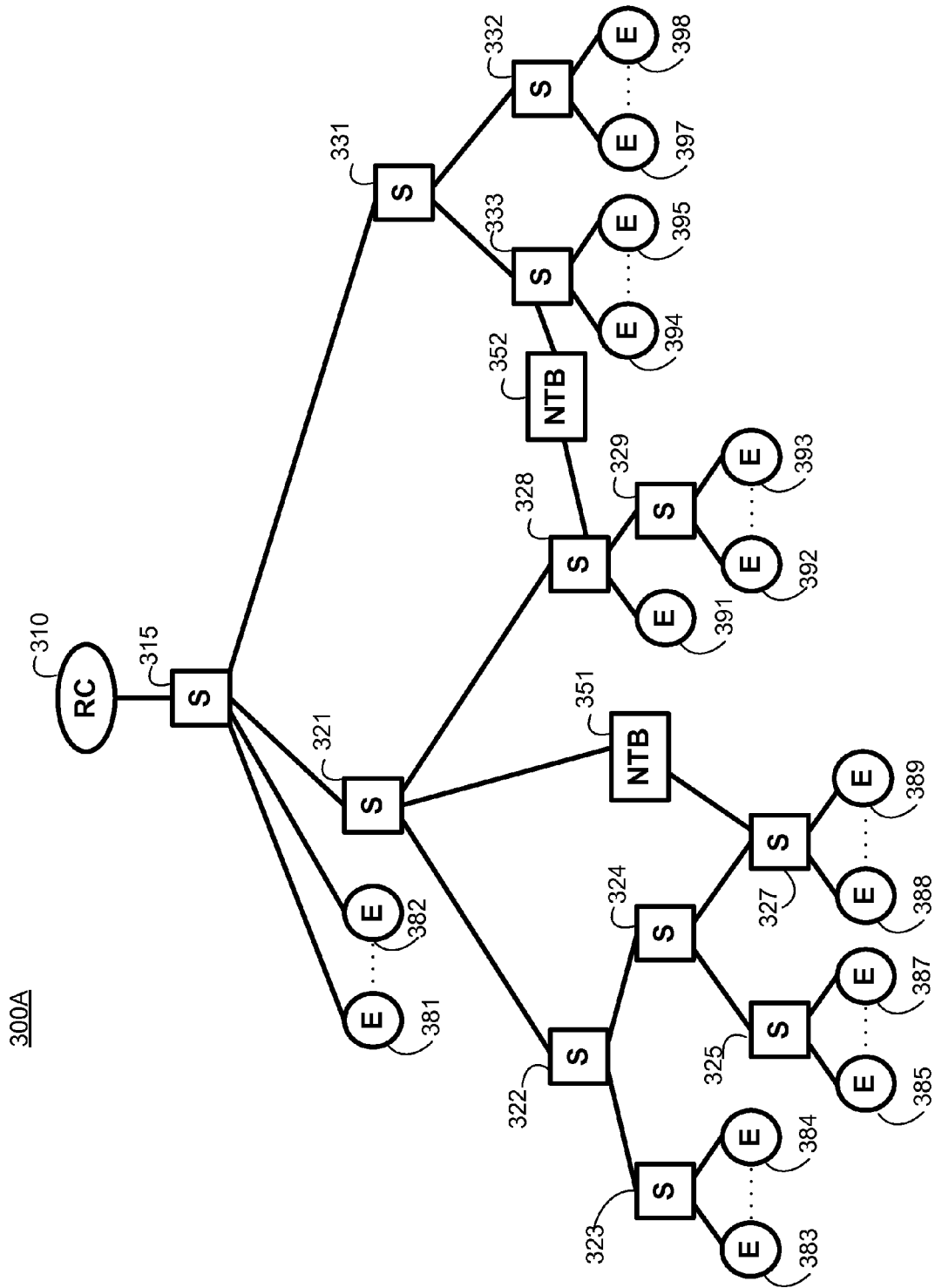
FIG. 2 is a block diagram of an exemplary network in accordance one implementation.

FIG. 2 is a block diagram of an exemplary network 300A in accordance with one embodiment. Network 300A includes root complex (RC) 310, a plurality of switches (e.g., 315, 321, 322, 323, 324, 325, 327, 328, 329, 331, 332, and 333), a plurality of end-point devices (e.g., 381, 382, 383, 384, 385, 387, 388, 389, 391, 392, 393, 394, 395, 398, and 399) and non-transparent bridge circuits 351 and 352. Network 300A is compatible with various tree type topology protocols or requirements (e.g., requirements associated with PCI, PCIe, etc.). Non-transparent bridge circuits (e.g., 351, 352, etc.) can be communicatively coupled to various devices such as switches or end-point devices (e.g., 321, 327, 389, etc.)

Figure 3:
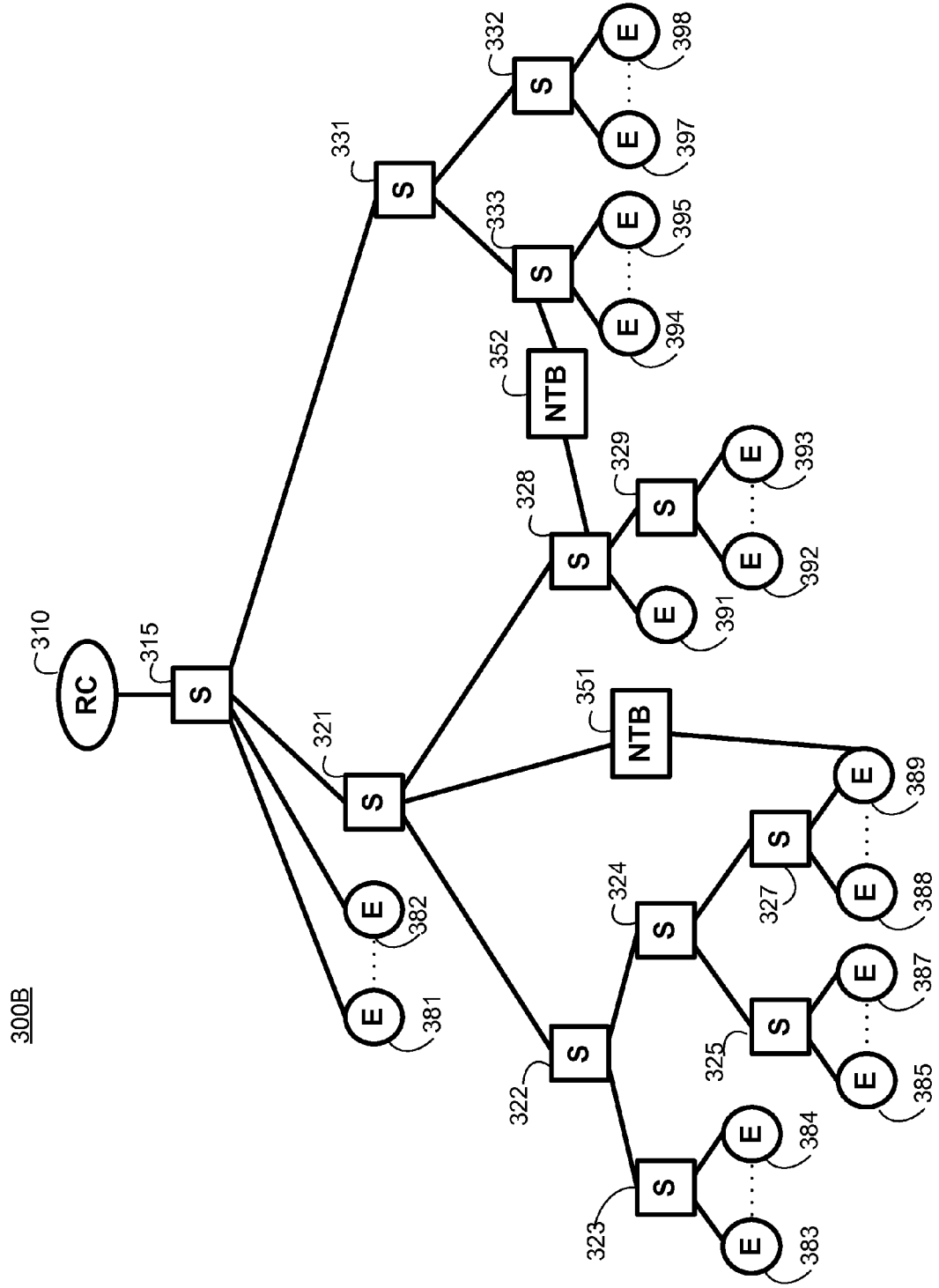
FIG. 3 is a block diagram of another exemplary network.

It is appreciated a new non-transparent bridge circuit can be implemented in a variety of ways. A new configuration approach can be built into a switch (e.g., similar to 315, 321, etc.) or can be a standalone device with separate connections to another switch (e.g., 351, 352, etc.). The non-transparent bridge circuit can be implemented similar to a bridge configuration (e.g., a bridge circuit, a Non-Transparent Bridge (NTB), etc.). As illustrated in FIG. 3, a non-transparent bridge circuit (e.g., 351, 352, etc.) can be used to facilitate alternative paths or connections between devices. For example, from switch 321 to switch 327 there is a first path (e.g., through non-transparent bridge circuit 351) and a second path (e.g., through switches 322 and 324).

As illustrated in FIG. 3, the topology of network 300A includes some similarities with a basic tree topology. For example, network 300A has a single root complex 115 of a tree with multiple branches. Each branch can span multiple hops and at the end of each branch there are leaves. A hop can include multiple communication connections between nodes (e.g., communication connections between root complex, switches, end-point devices, etc.). The leaves can include end-point devices (e.g., input/output (I/O) devices, CPUs, accelerators, etc.). Functionally, the root of the network 300A topology is in charge of control and management of the network (hence called Root Complex (RC)). Some of the key tasks of the Root Complex are to enumerate the resources (e.g., switches, end-point devices, etc.) connected to the network and to assign identifiers (e.g., memory addresses, etc.) to these resources. In one embodiment, a root complex is considered a master root complex circuit or PCIe root complex controller that coordinates address assignment to the plurality of switches, the plurality of end points and the non-transparent bridge. The PCIe root complex controller can consider a pair of address ranges assigned to a non-transparent bridge to be end-point address ranges.

While the topology of network 300A may have some similarities to a basic tree topology, there are also significant differences such as alternative paths. In one exemplary implementation, utilization of a new approach when building a network or system starts with a configuration similar to a basic tree topology and adds extra or alternative connections between switches. As indicated above, a non-transparent bridge circuit can be utilized to facilitate implementation of the alternative multiple paths. In network 300A there is a default or basic path formed by switches 321, 322, 324 and 327. There is an alternative path formed by switch 321, non-transparent bridge circuit 351 and switch 327. A communication from switch 321 to switch 327 (and vise versa) via the alternative path that includes non-transparent bridge circuit 351 is shorter or one less hop than the default path that includes switches 322 and 324.

In one embodiment a non-transparent bridge circuit can cross branches. In network 300A there is a path from switch 333 to switch 328 formed by switches 331, 315, 321, and 328. There is alternative path formed by non-transparent bridge circuit 352. A communication from switch 333 to switch 328 (and vise versa) via the alternative path that includes non-transparent bridge circuit 352 is shorter or two less hops than the default path that includes switches 331, 315 and 321.

It is appreciated that the new approaches can be implemented in a variety of configurations. In one exemplary implementation a non-transparent bridge circuit is coupled to switch device on one communication side and an end-point device on another communication side. FIG. 3 is a block diagram of an exemplary network 300B in accordance with one embodiment. Network 300B is similar to network 300A except non-transparent bridge 351 is coupled to end point device 389 instead of switch 327.

Alternative paths or connections formed by the a new non-transparent bridge circuit are a unique approach that can facilitate characteristics with complexity and capabilities well beyond limitations of conventional approaches. An exemplary implementation in accordance with the new approach can facilitate implementation of characteristics similar to different topologies while still being compatible with a particular protocol that is otherwise traditionally not compatible with the different topology characteristics. For example, facilitating implementation of characteristics (e.g., simple direct connections, etc.) similar to a basic tree topology and also characteristics (e.g., alternative connections, etc.) similar to another topology (e.g., fat-tree, CLOS, etc.), while still being compatible with a protocol (e.g., PCI, PCIe, etc.) that is otherwise traditionally not compatible with the different topology characteristics.

In one exemplary implementation, alternative paths that are otherwise not compatible with a PCIe protocol are implemented while communications remain compatible with PCIe protocol requirements (e.g., no looping communications, etc.) While the configuration of the components and connections may in a sense form a "loop" and a communication packet can reach the components that form the "loop", the communication packets are prevented from circulating around the loop in a manner that violates the PCIe protocol.

Reference is made herein to a side of a non-transparent bridge circuit or non-transparent bridge circuit. It is appreciated that the term side is not necessarily utilized to indicate a physical side but rather a side with respect to communication flow. For example, communication interface components (e.g., ports, input/output components, etc.) that are on different communication sides of the non-transparent bridge circuit can be located on the same physical side of a non-transparent bridge circuit component (e.g. ports located on the same physical side of a non-transparent bridge circuit but communicate with different other upstream and downstream devices, etc.). It is appreciated that upstream and downstream are terms that can be utilized to indicate a relative communication direction or relationship. The direction or relationship can be between the non-transparent bridge circuit and a particular centralized component (e.g., upstream can be associated with a direction towards a root complex, downstream can be associated with a direction away from a root complex, etc.). In one exemplary implementation, upstream is considered a side or direction from which control and/or configuration communications are received by the non-transparent bridge circuit and downstream is considered a side or direction from which control and/or configuration communications are forwarded or transmitted by the non-transparent bridge circuit.

Figure 4:
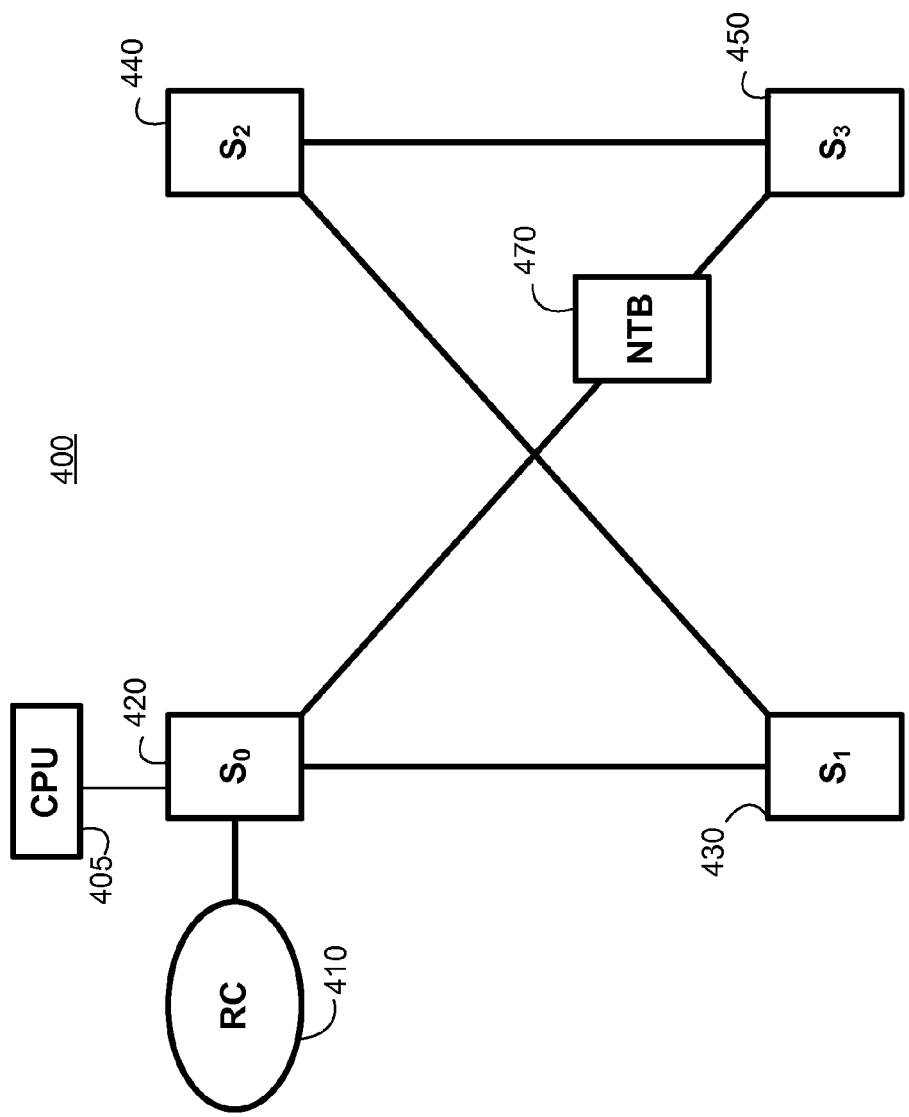
FIG. 4 is block diagram of an yet another exemplary network.

As indicated above, implementation of characteristics similar to multiple topology configurations can be realized. FIG. 4 is a block diagram of an exemplary network 400 topology presented in a manner to illustrate similarities with a simple fat-tree topology approach. Network 400 topology includes root complex 410, non-transparent bridge circuit 470, and switches 420, 430, 440 and 450. In one embodiment, the switches (e.g., 420, 430, etc.) are PCIe compatible switches in accordance with the new approach allowing a simple fat-tree topology to be built using the PCIe compatible switches. In one embodiment, the network 400 topology includes connections similar to "default" or basic PCIe path connections, in a sense forming a path similar to a basic tree (with a single 3 hop branch in a path including switches 420, 430, 440 and 450). The network 400 topology includes an alternative path connection that includes a non-transparent bridge circuit 470 configured in a way that allows communications to happen over this alternative link similar to a fat tree topology approach without breaking the rules or requirements of PCIe (e.g., regarding looping, etc.). Network 400 can include various end-point devices or resources coupled to the switches. For example, CPU 405 is a resource that is optionally coupled to switch 420 for performing various processing operations and results of the processing operations can be forwarded to switch 450 via non-transparent bridge 470.

In one embodiment, a key to enabling such alternative links or paths that facilitates complex and efficient topology characteristics, lies in the way the non-transparent bridge circuit is enumerated (e.g., identified, addressed, etc.) and configured. As briefly outlined above, a non-transparent bridge circuit can be configured as two end-points and the address translation capability of the non-transparent bridge circuit component can be used to interconnect the end-points and to forward packets between other devices. One of the pair of end-point indications or addresses associated with the non-transparent bridge circuit appears as an end-point to at least one device on one side (e.g., upstream, downstream, etc.) of the non-transparent bridge circuit. The non-transparent bridge circuit can translate the end-point indication or address into an indication or address associated with at least one other device on another side of the non-transparent bridge circuit. In one exemplary implementation, this allows a non-transparent bridge circuit to appear as an end-point to a device on one side of the non-transparent bridge circuit while still being able to communicate with a device on another side.

Figure 5B:
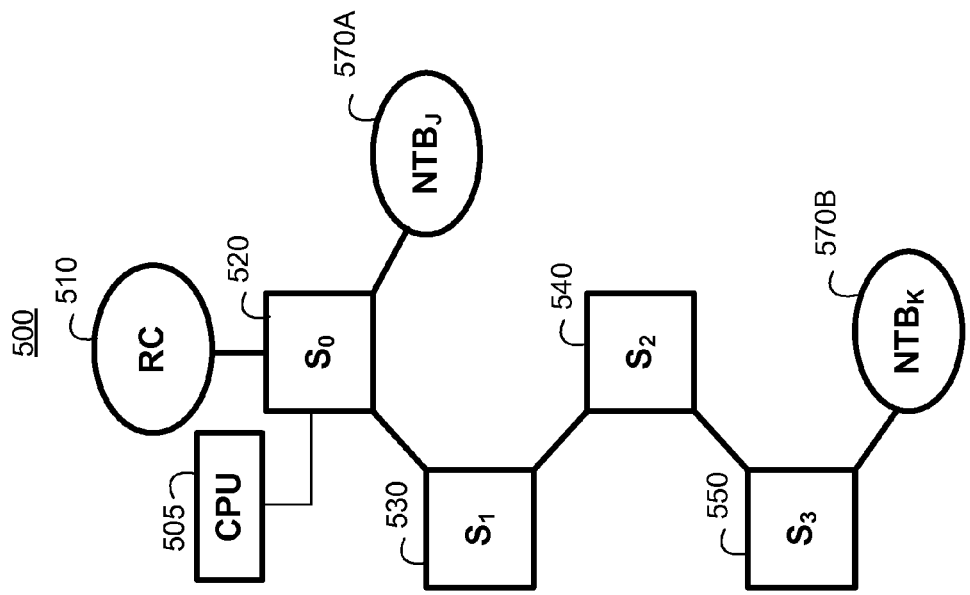
FIG. 5B is block diagram of an exemplary network topology representation presented in another manner to illustrate characteristics similar to a basic tree approach.
Figure 5A:
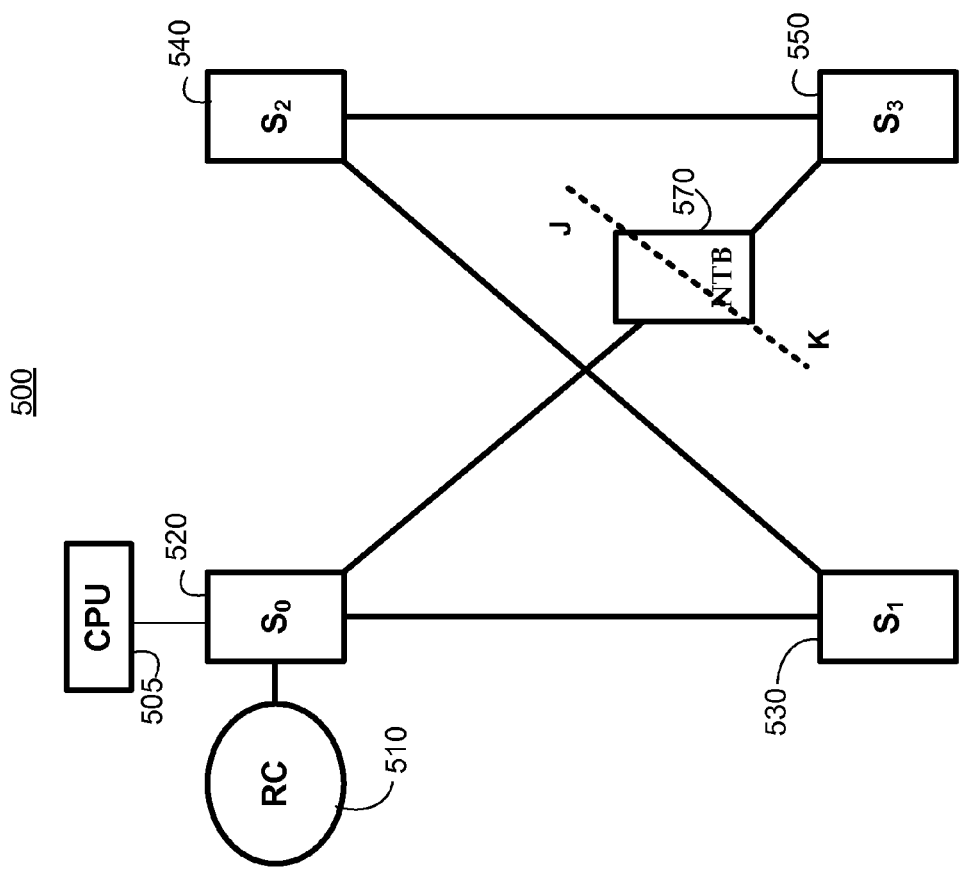
FIG. 5A is block diagram of an exemplary network topology representation presented in a manner to illustrate characteristics similar to a simple fat-tree approach.

FIGS. 5A and 5B are block diagrams of exemplary network 500 topology representations in accordance with one embodiment. Network 500 includes CPU 505, root complex 510, non-transparent bridge circuit 570, and switches 520, 530, 540 and 550. Non-transparent bridge circuit 570 is configured with two end-point indicators or addresses J and K. Non-transparent bridge circuit 570 is considered having two sides (e.g., upstream, downstream, etc.) and each side is configured or associated with one of the corresponding end-point indications or addresses. In one exemplary implementation, one side of the non-transparent bridge circuit 570 has a port that is communicatively coupled to switch 520 and is configured as end-point address J (with respect to communications from switch 520) and the other communication side of the non-transparent bridge circuit is configured as end-point address K (with respect to communications from switch 550). Again, the non-transparent bridge circuit 570 can facilitate implementation of the system or network with characteristics of multiple different topologies.

FIGS. 5A and 5B present the exemplary network 500 in two different manners to illustrate the similarities with characteristics of two different topologies. FIG. 5A is block diagram of an exemplary network 500 topology presented in a manner to illustrate characteristics similar to a simple fat-tree approach. In one embodiment, network 500 is similar to network 400. The topology can logically be represented in FIG. 5A, with the two ends of the non-transparent bridge circuit having characteristics similar to a fat-tree topology facilitating efficient alternative communication paths (e.g., shorter, less hops, etc. than other paths through switches 530 and 540). FIG. 5B is a block diagram of an exemplary network 500 topology presented in a manner to illustrate characteristics similar to a basic tree approach. As a consequence of the non-transparent bridge circuit being configured with a pair of end-point indicators, the topology can logically be represented in FIG. 5B, with the two ends of the non-transparent bridge circuit 570 having characteristics similar to end-points (e.g., 570A and 570B) in a basic tree topology and fully complying with PCI-Express standards.

In one embodiment, address translation is configured to enable data packets to pass through the non-transparent bridge circuit to and from other components (e.g., switch(es), CPU(s), I/O device(s), etc.) the addresses assigned to end-points (e.g., J and K, etc.) as well as the. In one example, addresses allocated to J have to correspond (e.g., be equivalent in length, etc.) to the addresses of resources being accessed on the other side of the non-transparent bridge circuit (e.g., that of the, switches, end-point devices, I/O devices or CPUs attached to switch 550), and vice versa, the address allocated to K has to correspond to the address(es) of the resource(s) being accessed through the non-transparent bridge circuit (e.g., that of the switches, end-point devices I/O devices or CPUs attached to switch 520). Additional explanation of address configurations and translations is set forth in later portions of the detailed description.

Figure 6:
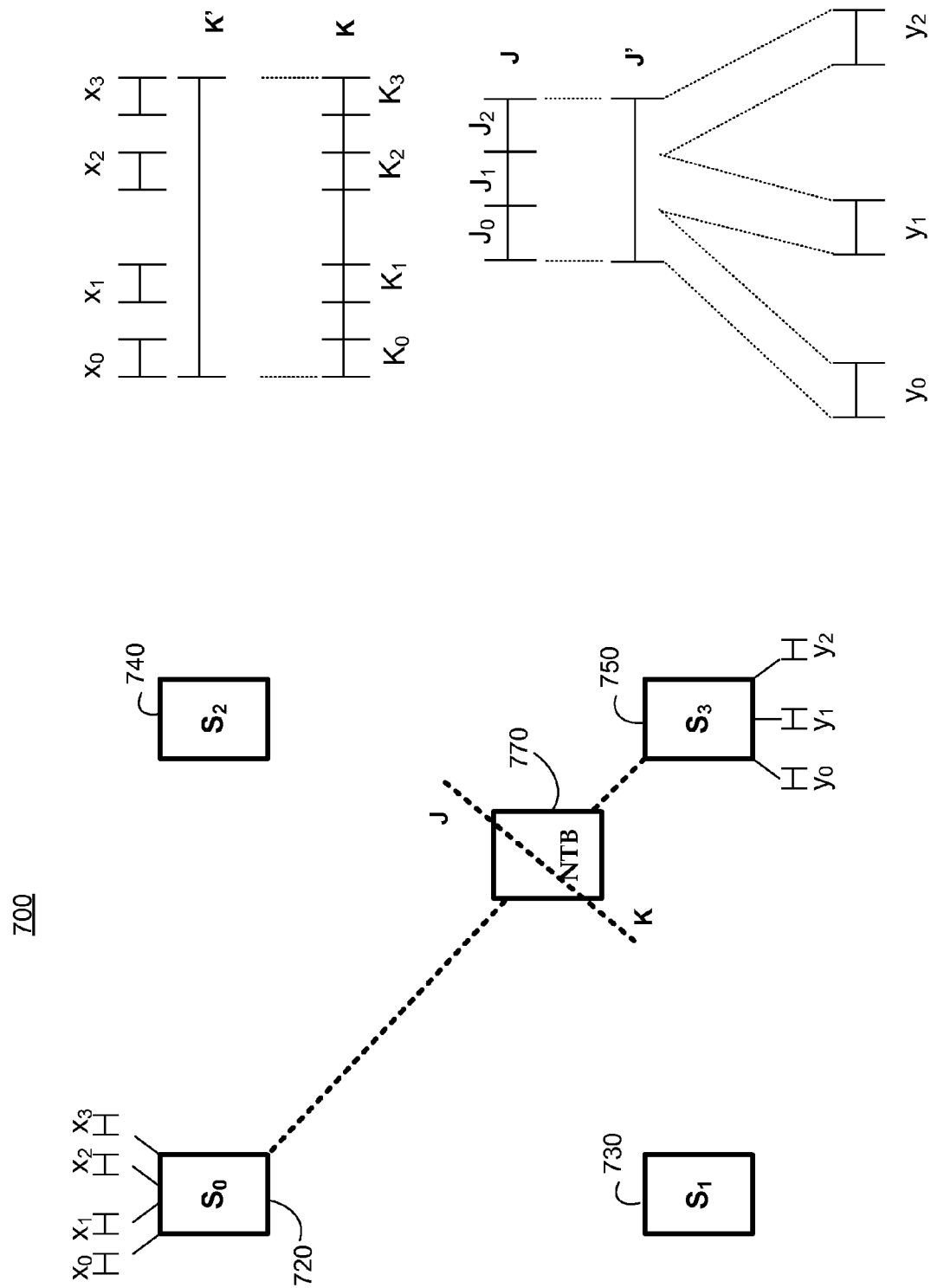
FIG. 6 is a graphical representation of an exemplary address allocation and mapping.

FIG. 6 is a graphical representation of exemplary address allocation and mapping in accordance with one embodiment. The address allocation and mapping can enable an additional alternative path connection that is compatible with a PCIe protocol. In one implementation network 700 is similar to network 500. Switch 750 is communicatively coupled through a path (not shown) via switches 730 and 740 and also through an alternative path via non-transparent bridge circuit 770. There are 3 resources (e.g., switches, end-point devices, I/O devices, CPUs, etc.) communicatively coupled to switch 750 and 4 resources communicatively coupled to switch 720. The 3 resources communicatively coupled to switch 750 are enumerated with indications or addresses (e.g., Y0, Y1 and Y2) and 4 resources connected to switch 720 are enumerated with indications or addresses (e.g., X0, X1, X2, and X3). The resources can be other devices in a network (e.g., similar to switch 327, end-point devices 388 and 389, etc.). The new approach enables the resources to communicate or access one another via a non-transparent bridge circuit 770 on an alternative path that utilizes the address translations. Various mapping approaches can be used to map addresses allocated to the non-transparent bridge circuit to the addresses of the resources on the other side of the non-transparent bridge circuit.

One mapping approach is illustrated on the top right side of FIG. 6. An address range is allocated to the non-transparent bridge circuit (side K in the example) and the size of the range is equal to or larger than the difference between the beginning of the first address and the end of the last address allocated to the resources on the other side of the non-transparent bridge circuit. An address range (e.g., address range K) allocated to the non-transparent bridge circuit is mapped to an address range (e.g., marked as K') associated with switch 720 that includes addresses for X0, X1, X2 and X3. For ease of explanation, portions or sub-ranges in K (e.g., K0, K1, K2 and K3) that correspond to X0, X1, X2 and X3 are shown. In one embodiment, for this mapping there is a single address translation register or entry in a table. An Address Translation table can be used to map the respective address ranges.

Another mapping approach, illustrated on the bottom right side of FIG. 6, is to use an Address Translation table to map the address range of the non-transparent bridge circuit (e.g., address range J) to the address ranges of the resources next to each other in the mapped address region. That is, the length or size of the address range allocated on one side of the non-transparent bridge circuit (e.g., address range J in this example) is equivalent to the sum of the addresses (e.g., Y0, Y1, and Y2) allocated to the resources on the other side of the non-transparent bridge circuit to be accessed. In addition, an entry in the Address Translation table is used to map each resources' address (e.g., Y0, Y1, and Y2) next to each other in the address space allocated to the non-transparent bridge circuit's other side (e.g., J). An address range (e.g., address range J) allocated to the non-transparent bridge circuit is mapped to an address range (e.g., marked as J') associated with switch 750 that includes addresses for Y0, Y1 and Y2. For ease of explanation, portions or sub-ranges in J (e.g., J0, J1, and J2) that correspond to Y0, Y1, and Y2 are shown.

It is appreciated that various considerations can be examined and analyzed in selecting an address translation approach. The approach on the top right of FIG. 6 can have a relatively simple translation mechanism but may have "gaps" in the address space. The approach on the bottom right can use the address space more efficiently than an approach with "gaps" in address space, but may require a more sophisticated translation mechanism inside the non-transparent bridge circuit.

In either case, the mapping ensures that resources can be accessed through the non-transparent bridge circuit by addressing communications to the mapped address of the non-transparent bridge circuit communication interface component (e.g., port, input/output component, etc.) instead of the original address of the resource which would lead packets to go over the default longer path. That is, if a node connected to switch 720 wants to access a resource connected to switch 750, the node addresses the appropriate region of the address range J of the non-transparent bridge circuit 770 instead of Y0, Y1 or Y2 and vice versa, if a node connected to switch 750 wants to access a resource connected to switch 720, it addresses the appropriate region of address K of the non-transparent bridge circuit 770 instead of X0, X1, X2 or X3. In one embodiment, resource X0 can be a CPU (e.g., similar to CPU 405, CPU 505, etc.) for performing various processing operations and results of the processing operations can be forwarded to switch 750 via non-transparent bridge 770. For example, the CPU X0 can forward a data packet with an address J0 to Non-transparent bridge 770 which translates the address J0 into Y0 and forwards the data packet to switch 750.

In one embodiment, the allocation and mapping of addresses utilized by the non-transparent bridge circuit can be controlled by the Root Complex of the network. The translation between the addresses can be performed by the non-transparent bridge circuit. The selection and programming of one of the alternative paths in a multi-path approach can be performed by the drivers.

Figure 7:
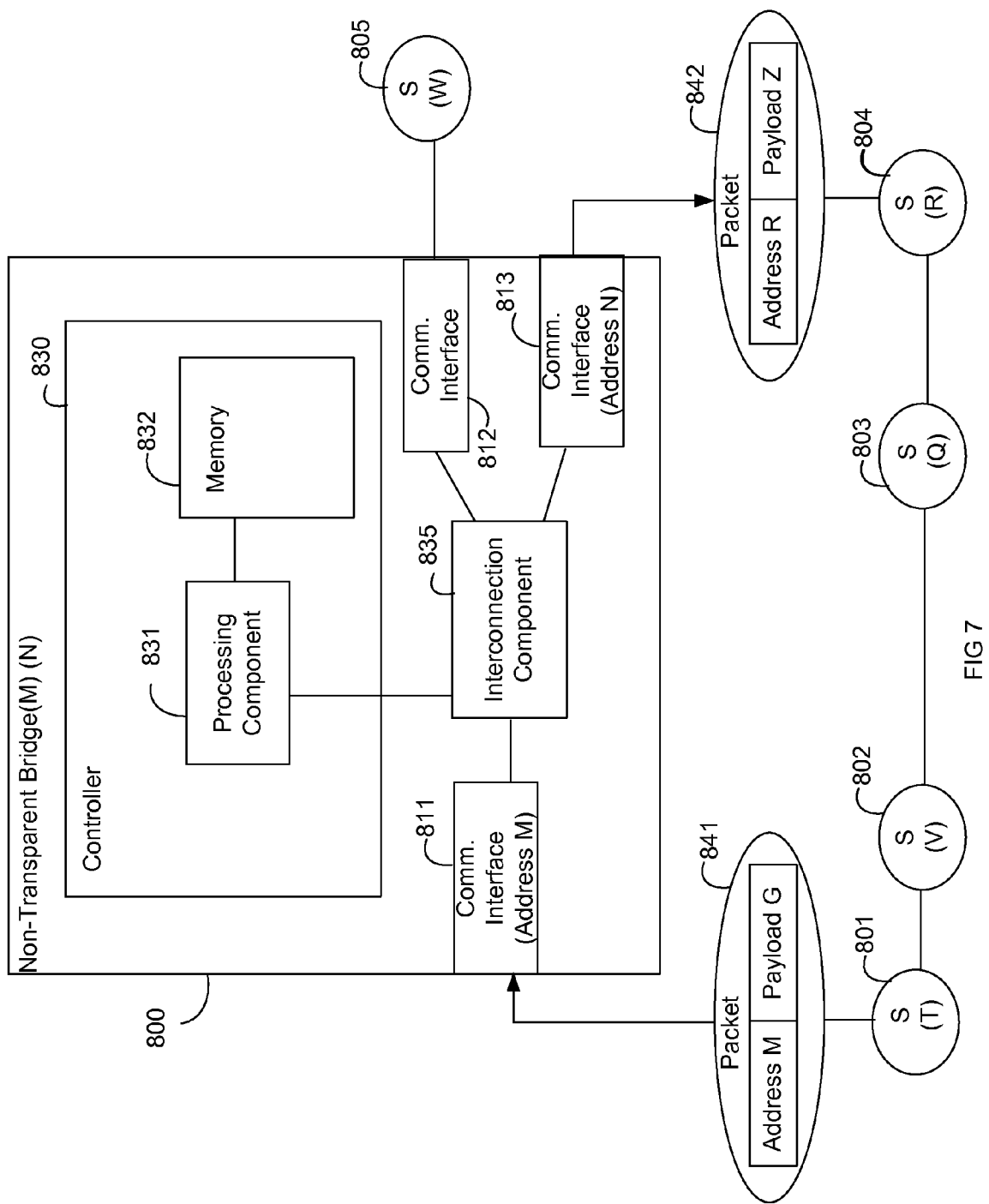
FIG. 7 is a block diagram of an exemplary apparatus in accordance with one embodiment.

FIG. 7 is a block diagram of exemplary non-transparent bridge 800 in accordance with one embodiment. Non-transparent bridge 800 can implement a non-transparent bridge configuration process and communication process. Non-transparent bridge 800 includes communication interface components 811, 812 and 813, interconnection component 835, and controller 830 which includes processing component 831 and memory 832. In one embodiment, controller 830 is considered a non-transparent bridge circuit. Communication interface components 811, 812, and 813 receive and transmit communications and can be implemented in various ways (e.g. communication ports, input/output terminals, etc.). Interconnection component 835 selectively couples the communication interface components 811, 812, and 813 to one another. Controller 830 controls the interconnection component 835. In one embodiment, memory 832 stores instructions and data (e.g., address translation tables, etc.) for performing various operations (e.g., including non-transparent bridge circuit configuration operations, interconnection control operations, etc.), and processing component 831 implements the instructions. It is appreciated processing component 831 (e.g., a central processing unit (CPU), an application specific integrated circuit (ASIC), a processing circuit, etc.) and memory 832 (e.g., a random access memory, a flash memory, a cache, etc.) and communications interface components 811, 812, and 813 (e.g., a port, a terminal, etc.) can have various configurations and implementations. In one exemplary implementation, at least one of the communication interface components (811, 812 and 813) is operable to receive communications; controller 830 is operable to translate between addresses associated with the communications, wherein translation includes translating between at least one address that at least one device considers an end-point address and an address of at least one other device; and at least one of the communication interface components (e.g., 811, 812, 813) is operable to forward communications in accordance with the translation.

Non-transparent bridge 800 is coupled to various other components or resources including switches 801,802, 803, 804, and 805. There are two communication paths between switch 801 and switch 804. One communication path includes switches 801, 802, 803, and 804. There is another communication path that includes switch 801, non-transparent bridge 800 and switch 804. Non-transparent bridge 800 is associated with or assigned at least one pair of end-point addresses (e.g., address M and address N). Switches 801,802, 803, 804, and 805 are associated with or assigned addresses T, V, Q, R and W respectively (shown in parenthesis in the FIG. 7). Data packet 841 is sent from switch (T) 801 to Non-transparent bridge 800) and data packet 842 is sent from non-transparent bridge 800 to switch (R) 804.

Figure 8:
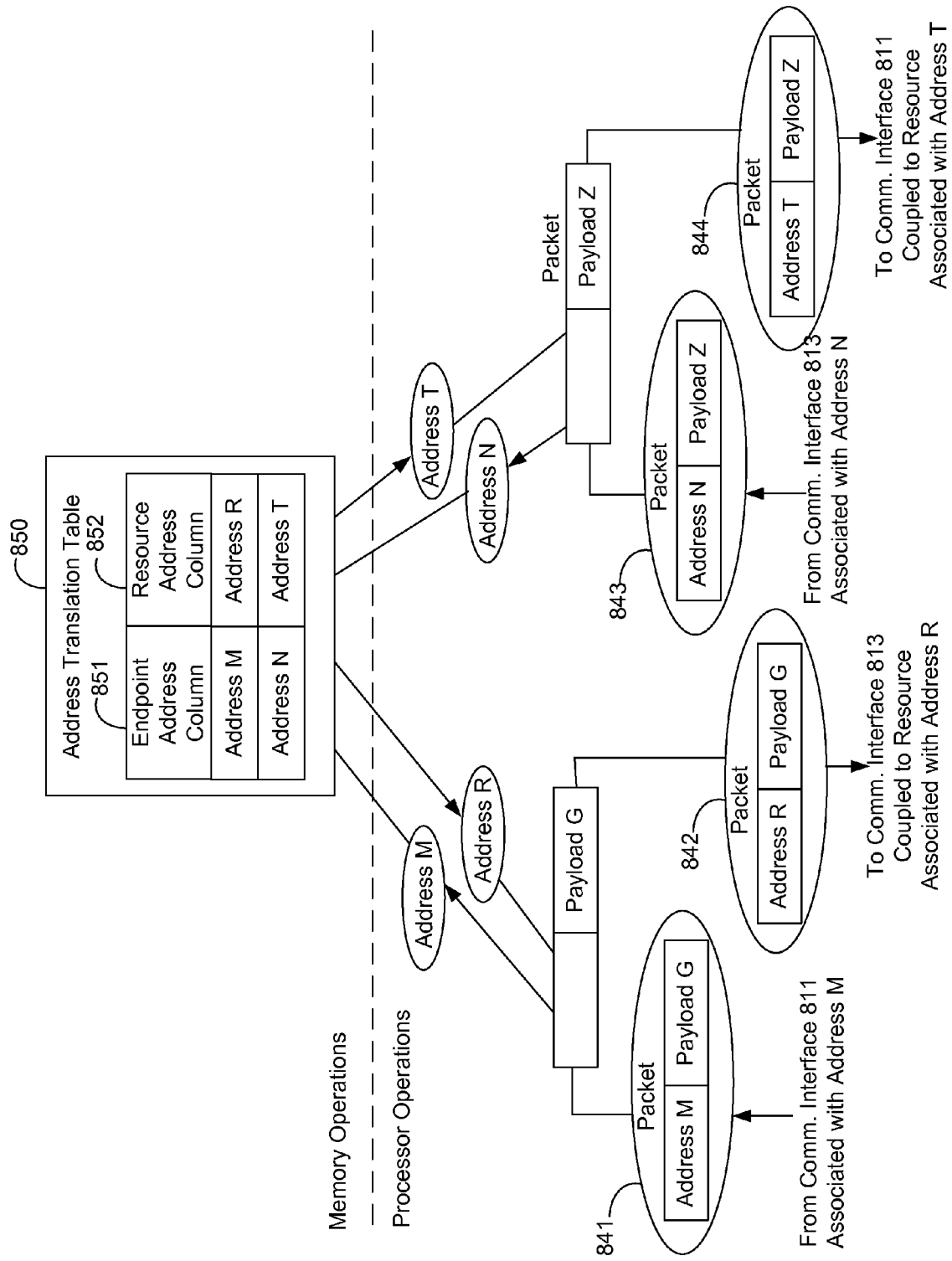
FIG. 8 is a block diagram of exemplary operations of an apparatus.

FIG. 8 is a block diagram of exemplary operations of non-transparent bridge 800 in accordance with one implementation. Memory 832 operations include storing an address translation table 850. Address translation table 850 includes end-point address column 851 and resource address column 852. End-point address column 851 includes end-point address M and end-point address N and resource address column 852 correspondingly includes address R and address T. Data packet 841 is received from communication interface component 811. The processor 831 directs removal of address M from the packet 841 and uses the address translation table to look up a mapping of address M to address R, which is attached to payload G to form data packet 842. Data packet 842 is forwarded from communication interface 813 to switch 804 in accordance with address R. Similar operations are performed for data coming from switch 804 to switch 801. Data packet 843 is received from communication interface component 813. The processor 831 directs removal of address N from the packet 843 and uses the address translation table to look up a mapping of address N to Address T, which is attached to payload Z to form data packet 844. Data packet 844 is forwarded from communication interface 811 to switch 801 in accordance with address T.

In one embodiment, a non-transparent bridge circuit (e.g., similar to non-transparent bridge circuit 800, etc.) can be a bridge circuit included in a PCIe network. In addition to the bridge circuit, the PCIe network can include a plurality of switches coupled together to transmit packets between end-point devices coupled to the switches and the bridge circuit. The bridge circuit (e.g., similar to 351, 352, etc.) can include a processor that uses an input port to accept a data packet originating from a source end-point device from a first switch (e.g., similar to 389, 327, etc.). The processor examines an address contained in the data packet and, based on the address, directly forwards the data packet to a second switch (e.g., similar to 321, etc.), bypassing an intervening switch (e.g., similar to 324, 322, etc.) which is part of a tree topology. The processor can use an output port to transmit the data packet to the second switch which transmits the data packet to a destination end-point device. Bypassing the intervening switch and forwarding the data packet to the second switch is PCIe compliant. The processor can establish a topology configuration corresponding to two end-points (e.g. similar to 570A and 570E in FIG. 5, etc.) and a data path is created between the two end-points. The data path is used to directly forward the data packet to the second switch. The data path can include a multi-path connection in the tree topology and is PCIe compliant.

The bridge circuit also includes a memory that stores information and instructions for the processor. The memory can store an address translation table that maps the address contained in the data packet to an address associated with the second switch, wherein the address in the data packet is one of a pair of a PCIe compliant end-point addresses (e.g., J and K in FIG. 6, etc.) associated with the bridge and the data packet is transmitted through the data path by addressing the address associated with the second switch stored in the address translation table. A single entry in the address translation table can be utilized to store the address contained in the data packet.

A non-transparent bridge circuit can enable a multi-path PCIe transmission system in accordance with a new approach described herein. The non-transparent bridge circuit can include a processor that uses an input port to accept a data packet (e.g., originating from a source end-point device from a first switch, etc.). The processor examines an address contained in the data packet and, based on the address, forwards the data packet to a second switch, wherein the second switch is capable of being coupled to a third switch which can be used to also route the data packet from the first switch to the second switch. The processor uses an output port to transmit the data packet to the second switch which transmits the data packet to a destination end-point device. The first address can fall within an address range allocated to the non-transparent bridge circuit. In one approach, the size of the address range is equal to or larger than the difference between a beginning address and an end address allocated to a plurality of resources (e.g., switches, end-point devices, etc.) couple to the non-transparent bridge circuit, the second switch included in the plurality of resources. In another approach, the size of the address range is equivalent to the sum of addresses allocated to a plurality of resources couple to the non-transparent bridge circuit, the second switch included in the plurality of resources.

Again, the non-transparent bridge circuit can also include a memory that stores information and instructions for the processor. The processor utilizes an address translation table stored in the memory and a single entry in the address translation map is used for the first address. In one example, the first address falls within an address range allocated to the non-transparent bridge circuit and the size of the address range is equivalent to the sum of addresses allocated to a plurality of resources couple to the non-transparent bridge circuit, the second switch included in the plurality of resources. In another example, the length of the first address is equivalent to the length of addresses assigned to resources on one communication side of the non-transparent bridge circuit and the length of the third address is equivalent to the length of addresses assigned to resources on an opposite communication side of the non-transparent bridge circuit.

The non-transparent bridge circuit can be a separate entity or the non-transparent bridge circuit can be incorporated in a switch.

In one embodiment, a non-transparent bridge circuit (e.g., non-transparent bridge, etc.) participates in a communication process. FIG. 9 is a block diagram of communication process 900 in accordance with one embodiment. The communication is between two devices. The first device is on one communication side of the non-transparent bridge circuit and the second device is on another communication side of the non-transparent bridge circuit (e.g., information is received from an upstream device and forwarded to a downstream device, or vice versa, etc.). In one example, communication process 900 is performed in a PCIe compliant environment. Data packets are transmitted via a non-transparent bridge circuit in a PCIe compliant network including a plurality of switches and endpoints coupled to the non-transparent bridge circuit In block 910, a data packet from a first one of the plurality of switches in the PCIe compliant network is received in a processing component of the non-transparent bridge circuit, the data packet includes a first address that is first address that is within one of a pair of address ranges associated with the non-transparent bridge circuit. The a pair of address ranges associated with the non-transparent bridge circuit can be assigned by a PCIe root complex controller. The PCIe root complex controller can consider the pair of address ranges to be end-point address ranges In block 920, replacing the first address in the data packet with a second address to form a modified data packet, the second address is associated with a second one of the switches included in the plurality of switches in the PCIe compliant network. The first address can be mapped to the second address and the mapping can be utilized to translate the first address to the second address. The modified data packet is generated by the replacing of the first address in the data packet with the second address. The mapping can prevent data packets from being transmitted through a loop transmission path formed at least in part by the first data path and the second data path.

It is appreciated the addresses and address ranges can have a variety of configurations. The size of the one of the pair of address ranges can be equal to or larger than the difference between a beginning address and an end address allocated to a plurality of resources coupled to the non-transparent bridge. The size of the one of the pair of address ranges can be equivalent to the sum of addresses allocated to a plurality of resources coupled to the non-transparent bridge. In one exemplary implementation, the second switch is included in the plurality of resources. The length of one of the pair of address ranges can be equivalent to the length of addresses assigned to resources on one communication side of the non-transparent bridge and the length of the of another one of the pair of address ranges can be equivalent to the length of addresses assigned to resources on an opposite communication side of the non-transparent bridge.

In block 930, the second data packet is forwarded from the processing component to the second switch via a first data path between the first switch and the second switch, bypassing an intervening third switch in a second data path connected to the first one of the plurality of switches and the second one of the plurality of switches. In one exemplary implementation, the first data path and second data path enable multi-path routing in the PCIe compliant network. The first data path can be at least one hop less than the second data path in the PCIe compliant network.

FIG. 11 is a flow chart of exemplary apparatus configuration process or method 1100 in accordance with one embodiment of the present invention. In one exemplary implementation, the apparatus is compatible with Peripheral Component Interconnect Express (PCIe) protocol requirements. The apparatus can emulate at least some non basic tree topology characteristics (e.g., characteristics similar to a fat-tree topology, CLOS topology, 2D topology, 3D topology, etc.). In an effort to give an overview, a general description of method 1100 is presented initially and additional explanation of various aspects of operations (e.g., configuring an apparatus, various topologies, etc.) that are compatible with method 1100 is set forth in other portions of the detailed description.

In block 1110, an apparatus is configured to be associated with a first address. The first address is considered an endpoint address by a first device that the apparatus receives information from even though the apparatus forwards the information received from the first device to a second device. The second device is associated with a second address. A first end-point address can be associated with a first communication interface component (e.g., a port of an apparatus, a input/output component of an apparatus, etc.). For example, the first end-point address can be associated with at least one communication side of an apparatus (e.g., associated with communications received from an upstream side of a component, etc.).

In block 1120, the apparatus is configured to be associated with a third address. The third address is considered an end-point address by the second device the apparatus receives information from even though the apparatus forwards the information received from the second device to the first device. The second device is associated with a fourth address. The second address is associated with a second communication interface component. The third address is associated with at least one different communication side of the apparatus (e.g., associated with communications received from a downside communication component, etc.).

In block 1130, an address translation capability is established. In one embodiment, the address translation capability enables translation between the first address and second address and also between the third address and fourth address. Communications received with the first and third addresses are forwarded in accordance with the address translations to the second and fourth addresses respectively, even though the first and third addresses are considered end-point addresses (e.g., in a PCIe compliant topology, etc). It is appreciated the address translation capability can be compatible with a variety of address allocation and mapping approaches. The translation capability can include a capability of translating between an end-point indication or address that appears as an end-point to at least one device and an indication or address of at least one other device.

The apparatus configuration process can facilitate at least one alternative communication path between at least two other devices (e.g., the first device and second device, etc.) while remaining compatible with a protocol that otherwise restricts or discourages use of an alternative communication path. The alternative communication path between the two devices can be shorter or more direct (e.g., have less hops, etc.) than another communication path communicatively coupling the two devices. A handshaking communication to establish configuration and initialization of a connection with another device can be performed as part of the apparatus configuration process (e.g., as part of establishing addresses, assignment of communication interfaces, ports or input/output components, etc.).

Performance of communicatively coupled or networked components is often dependent upon the protocol and topology implemented within a communication environment. Different protocols and topologies often have the potential to offer various performance efficiencies in various environments or applications (e.g., single system, networked systems, servers, data center, etc.). Protocols have rules and restrictions that traditionally preclude or discourage implementation with some topologies, and thereby often limit the potential realization of various efficiencies associated with implementation of different protocols' and topologies' characteristics and features. Unlike limited attempts of conventional approaches, an implementation of the new approach can facilitate utilization of efficient protocols in environments with various characteristics (e.g., similar to a variety of topologies, etc.) that are not otherwise efficiently utilized in conventional approaches. In one exemplary implementation, a new apparatus approach facilitates utilization of a PCIe compatible protocol across network configuration similar to various topologies (e.g., fat tree, CLOS, 2D and 3D torus, etc.).

Some conventional topologies have thresholds or boundaries of diminishing effectiveness where performance begins to be impacted (e.g., greater latency, longer paths, slowed communication, bottlenecks, unduly burdened paths, etc.). In one embodiment, a new configuration approach facilitates continued efficient operation of a protocol beyond thresholds or boundaries of otherwise diminishing effectiveness. The threshold or boundaries can be associated with various network characteristics (e.g., complexity, size, etc.). The thresholds or boundaries can be considered to define domains and the new apparatuses are implemented at the thresholds or boundaries of the domains.

In one embodiment, the apparatuses can be considered to be implemented at points of otherwise diminishing performance. The apparatuses can enable continued efficient and effective utilization of a protocol beyond points that the protocol would otherwise be less efficient and effective. In one exemplary implementation, topology of the components within a domain is relatively simple while the overall configuration topology of multiple domains is considered to be complex and complicated. The new approach can facilitate use of an efficient protocol within a domain and continued efficient use of the protocol across the domains (e.g., unlike conventional attempts at implementing the protocol across the domains which are typically prohibited of often result in diminishing effectiveness).

Figure 12:
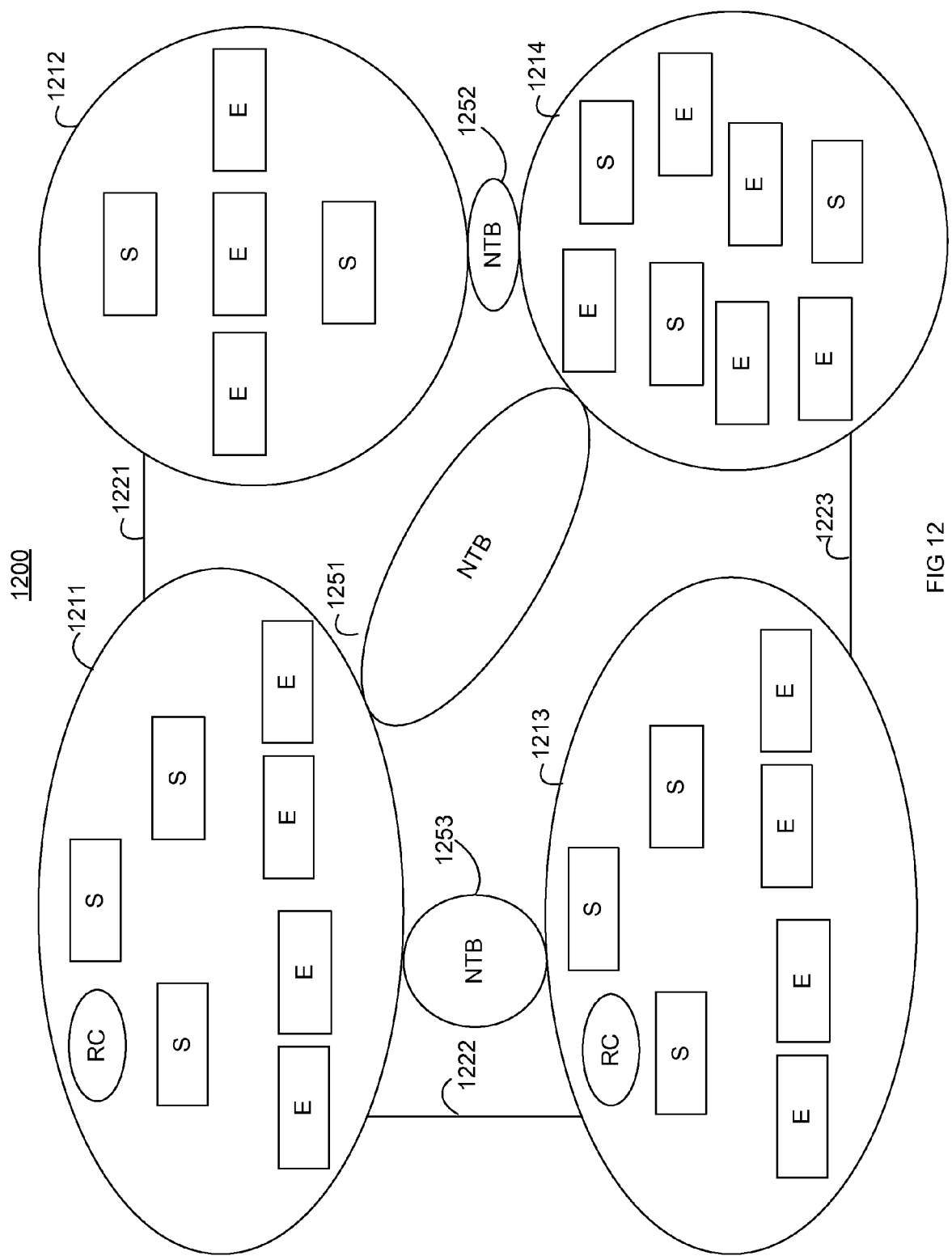
FIG. 12 is a block diagram of yet another exemplary network in accordance one implementation.

FIG. 12 is a block diagram of an exemplary network 1200 in accordance with one embodiment. Network 1200 includes domains 1211, 1212, 1213, and 1214 which each include various switches (S), end-point devices (E), and root complex components (RC) coupled to each other within a domain in a variety of configurations. Connections within a domain are not shown so as not to obfuscate the flexibility of the illustrated new approach implementation of coupling between the domains. It is appreciated that the switches and end-point devices can be implemented in a variety of configurations. The domains 1211, 1212, 1213, and 1214 can be communicatively coupled by interconnections 1221, 1222 and 1223. The domains 1211, 1212, 1213, and 1214 can also be communicatively coupled by alternative paths that include non-transparent bridge circuits 1251, 1252 and 1253. In one embodiment, the communicative coupling of the domains by non-transparent bridge circuits 1251, 1252 and 1253 is compatible with an efficient protocol and implemented without the performance diminishing impacts or characteristics of interconnections 1221, 1222 and 1223.

FIG. 10 is a flow chart of an exemplary method 1000 for transmitting data packets through a bridge in a PCIe compliant transmission system in accordance with one embodiment. The bridge can include a non-transparent bridge circuit.

In block 1010, a processor is initialized to simulate two end-point devices and establish a link between one of the two end-point devices being simulated by the processor and a second switch. The link comprises part of a first data path from the first switch to the second switch. The first PCIe end-point address is mapped to the second address in order to transmit the data packet through the link. The mapping can prevent data packets from being transmitted through a loop transmission path formed at least in part by the first data path and the second data path. The first data path and second data path can enable multi-path routing in the PCIe transmission system. In one approach, the first path and second path establish a plurality of transmission connections between a plurality of switches, including the first switch and the second switch, to form a high-dimensional topology that is PCIe compliant.

In block 1020, a data packet is received in a processor, the data packet originating from a source end-point device from the first switch. The data packet being directed to the first address corresponding to one of the two simulated end-point devices.

In block 1030, translating in the processor, the first address associated with the bridge (e.g., a PCIe end-point address) to the second address associated with the second switch. The translation is performed using mapped information from an address translation table.

In block 1040, forwarding the data packet from the processor to the second switch via the first data path, bypassing an intervening switch in a second data path which is part of an initial tree topology. The second data path is greater than one hop in the tree topology. Transmission of the data packet is at least in part through the first data path from one PCIe end-point device to another PCIe end-point device.

It is appreciated, the new configuration approach can enable multi-path routing in a network compatible with PCIe requirements. This can facilitate building more complex network topologies than the basic tree approaches. In one embodiment, the new approach can enable realization of many of the characteristics similar to a PCIe protocol while still facilitating realization of characteristics similar to various topologies (e.g., fat-tree, CLOS, 2D or 3D torus, etc.). For example, PCIe Non-Transparent Bridges configured in accordance with the new approach can be utilized for interconnecting multiple segments of a topology similar to a tree topology and thus create additional alternative links without breaking or violating the fundamentals of the particular protocol (e.g., PCI, PCIe, etc.). Thus, while conventional PCIe implementation attempts are currently mostly limited to deployment within single enclosures (e.g., servers, PCs, etc.) and primarily at the printed circuit board (PCB) level, the new approach can facilitate implementation of PCIe attributes and advantages in numerous more complex and complicated situations. In one exemplary implementation, being compatible with the PCIe protocol enables the new approach to be a flexible and cost efficient alternative to current Data Center interconnect technologies, such as Ethernet (ETH) and InfiniBand (IB).

As indicated above, a new approach can include many characteristics or features similar to a tree type protocol or topology (e.g., PCI, PCIe, etc.). In one embodiment, a single link can scale up to 256 Gbps with a latency of approximately 130 ns per switch hop. The bandwidth of links can be flexibly configured from 1 to 16 lanes (e.g., lane counts can be a power of 2, etc.), with up to 8 Giga bits per second (Gbps) per lane (higher throughput may be provided per lane). The switches are capable of interconnecting links with different speeds (e.g., number of lanes, etc.) and lane counts per link (e.g., switch port, etc.) can be dynamically reconfigured.

In one embodiment, the technology can provide hardware level resource sharing with a large set of different PCIe based I/O devices compatible with this technology. The new non-transparent bridge circuits are capable of interacting with conventional PCIe technology widely used within servers. A CPU can have PCIe compliance built into the chip, not requiring any additional chipset to be connected between the CPU and the peripherals. In one exemplary implementation, clusters or Data Centers based on the new approach can be compatible with a PCIe interconnect and achieve greatly improved cost efficiency (e.g., due to the lower number and types of components needed in the system, etc.). In addition, compared to ETH and IB the power consumption of PCIe switches is several times lower per Gbps, further contributing to the cost efficiency of such a system.

As per functionality, besides hardware-level resource virtualization, similar to PCIe implementations, in one embodiment a new approach can also provide RDMA (Remote Direct Memory Access) functionality, making it a viable solution for high-speed, low-latency CPU-to-CPU communication. In one exemplary implementation, the new approach can also use built-in credit-based flow-control, providing reliable data transfer at the hardware level, requiring a much "slimmer" software stack. The technology can also support cabling for the network to span larger distances and is flexible enough to support different network topologies. There are several solutions with low cost adapters and cables, making it a potential, cost-efficient Data Center interconnect.

The following table summarizes some of the attributes (e.g., that are similar to PCI-Express, etc.) that can be realized in a new approach in one embodiment compared to that of Ethernet and InfiniBand.

|  | Ethernet | InfiniBand | PCIe |
| --- | --- | --- | --- |
| Bandwidth (Gbps) | 10/40/100 | 2-300 | 8-256 |
| Latency (ns) | 200-300 | 160 | 120 |
| Scalability | Unlimited | $O(10^3)$ | up to 64K |
| Reliable transfer | x | ✓ | ✓ |
| RDMA | iWARP/RoCE | ✓ | ✓ |
| Inter-chassis | ✓ | ✓ | ✓ |
| I/O virtualization | x | x | ✓ |

In one embodiment, a new approach can leverage aspects of being compatible with PCIe, including the aspect that the PCIe standardization organization (e.g., PCI-SIG) only defines the protocol and packet formats, but vendors implementing the technology are free to implement any functionality inside their devices (i.e. switches, end-points, etc.), providing a great level of flexibility and potential for supporting different functionalities for applications otherwise missing from other Data Center interconnection technologies. In one embodiment with the above mentioned attributes, a new approach compatible with PCI-Express can be identified as a Unified Interconnect for various types of communications among the components within a Data Center.

In one embodiment, the new approach or methodology facilitates scaling the size of a PCI-Express network beyond its current limitation of 256 nodes, by interconnecting or coupling multiple PCIe network domains. Each PCIe domain has its own management entity or node (e.g., similar to a first PCIe root complex controller, etc.) that cooperates with other domains' management entity or node for correct address configuration within its own domain. This allows inter-domain data access between the nodes connected to either network domain. In one embodiment, a non-transparent bridge circuit enables scaling. The non-transparent bridge circuit includes a processor coupled to an input port to accept a data packet from a first PCIe network domain comprised of up to 256 nodes; the processor examines an address contained in the data packet and, based on the address, forwards the data packet to a second PCIe network domain comprised of up to 256 nodes, and the processor uses an output port coupled to the processor that transmits the data packet to the second PCIe network domain. The non-transparent bridge circuit is associated with a pair of end-point addresses that are PCIe compliant, wherein a first one of the pair of end-point addresses is assigned by a first PCIe root complex controller associated with the first PCIe network domain and the second one of the pair of end-point addresses is assigned by a second PCIe root complex controller associated with the second PCIe network domain. The data packet is transmitted between the first PCIe network domain and the second PCIe network domain via the non-transparent bridge circuit in accordance with address entries in the address translation table.

The non-transparent bridge circuit also includes a memory that stores information and instructions for the processor. The memory can store an address translation table that maps the first one of the pair of end-point addresses to a second address associated with a one of the nodes included in the second PCIe network domain, and maps the second one of the pair of end-point addresses to a fourth address associated with one of the nodes included in the first PCIe network domain.

As set forth above, the new approaches described herein can facilitate high-dimensional PCI-Express (PCIe) network implementations. The new approaches can facilitate utilization of an efficient protocol (e.g., PCIe, etc.) while enabling implementation of various characteristics and features (e.g., characteristics and features similar to a fat-tree topology, CLOS topology, 2D and 3D topologies, etc.) that would otherwise not be compatible with the protocol. For example, implementation of alternative paths can be enabled and utilized while maintaining compliance with a protocol (e.g., PCIe, etc.) that would otherwise not be compatible with the use of alternative paths. The alternative paths can facilitate flexible topology implementation and network domain scaling while enabling improved communication latency. In one embodiment, presented systems and methods facilitate utilization of a non-transparent bridge circuit configured as an end-point with respect to communications from at least one device while facilitating transmission of the communications on to at least one other device.

Embodiments described herein may be discussed in the general context of computer-executable instructions, such as program modules, residing on some form of computer-readable storage medium executed by one or more computers or other devices. By way of example, and not limitation, computer-readable storage media may comprise non-transitory computer-readable storage media. Non-transitory computer-readable storage media includes all computer-readable media except for a transitory, propagating signal. Computer-readable storage media includes volatile and nonvolatile, removable and non-removable media implemented in any method or technology for storage of information such as computer-readable instructions, data structures, program modules or other data. Generally, program modules include routines, programs, objects, components, data structures, etc., that perform particular tasks or implement particular abstract data types. The functionality of the program modules may be combined or distributed as desired in various embodiments.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

The invention claimed is:

1. A non-transparent bridge circuit for communicating information in a PCIe network comprising a plurality of switches and a plurality of end-point devices, the non-transparent bridge circuit comprising:
   a first network connection connected to a first switch in a first tree branch of the PCIe network and a second network connection connected to a second switch in a second tree branch of the PCIe network, wherein the non-transparent bridge circuit is assigned a first range of addresses with respect to the first switch and a second range of addresses with respect to the second switch;
   a processing circuit; and
   a memory that stores information for the processing circuit;
   the processing circuit being configured to:
   receive a first data packet from the first switch, the first data packet includes a first payload portion and a first destination address that is within the first range of addresses assigned to the non-transparent bridge;
   translate the first destination address to a first translated destination address, wherein the first translated destination address belongs to an endpoint device in the second tree branch and connected to the second switch;
   generate a first modified data packet including the first payload portion and the first translated destination address; and
   forward the first modified data packet to the second switch for delivery to the endpoint device in the second tree branch.

2. The non-transparent bridge circuit of claim 1, in which the processor is further configured to:
   receive a second data packet from the second switch, the second data packet includes a second payload portion and a second destination address that is within the second range of addresses assigned to the non-transparent bridge;
   translate the second destination address to a second translated destination address, wherein the second translated destination address belongs to another endpoint device in the first tree branch and connected to the first switch;
   generate a modified data packet including the second payload portion and the second translated destination address; and
   forward the second modified data packet to the first switch for delivery to the endpoint device in the first tree branch.

3. The non-transparent bridge circuit of claim 1, in which the memory stores an address translation table that maps the first destination address to the first translated destination address.

4. The non-transparent bridge circuit of claim 3, in which a single entry in the address translation table is utilized to store the first destination address contained in the first data packet.

5. The non-transparent bridge circuit of claim 1, in which forwarding the modified data packet to the second switch bypasses an intervening third switch in the second branch and remains PCIe compliant.

6. The non-transparent bridge circuit of claim 1, wherein the non-transparent bridge circuit is a separate entity.

7. The non-transparent bridge circuit of claim 1, wherein the non-transparent bridge circuit is incorporated in a fourth one of the plurality of switches.

8. A method for transmitting data packets via a non-transparent bridge circuit in a PCIe compliant network including a plurality of switches and endpoints coupled to the non-transparent bridge circuit, the method comprises:
   receiving in a processing component of the non-transparent bridge circuit a data packet from a first one of the plurality of switches in the PCIe compliant network, the data packet includes a first address that is within one of a pair of address ranges associated with the non-transparent bridge circuit;
   replacing the first address in the data packet with a second address to form a modified data packet, the second address is associated with a second one of the switches included in the plurality of switches in the PCIe compliant network; and
   forwarding the modified data packet from the processing component to the second switch via a first data path between the first switch and the second switch, bypassing an intervening third switch in a second data path connected to the first one of the plurality of switches and the second one of the plurality of switches.

9. The method of claim 8 enabling at least one alternative in which the first data path is at least one hop less than the second data path in the PCIe compliant network.

10. The method of claim 8 enabling at least one alternative further comprising mapping the first address to the second address, utilizing the mapping to translate the first address with the second address, and generating the modified data packet by the replacing of the first address in the data packet with the second address.

11. The method of claim 10 enabling at least one alternative in which the mapping prevents data packets from being transmitted through a loop transmission path formed at least in part by the first data path and the second data path.

12. The method of claim 8 enabling at least one alternative in which the first data path and second data path enable multi-path routing in the PCIe compliant network.

13. The method of claim 8 enabling at least one alternative in which the size of the one of the pair of address ranges is equal to or larger than the difference between a beginning address and an end address allocated to a plurality of resources coupled to the non-transparent bridge, the second switch is included in the plurality of resources.

14. The method of claim 8 enabling at least one alternative in which the size of the one of the pair of address ranges is equivalent to the sum of addresses allocated to a plurality of resources coupled to the non-transparent bridge, the second switch is included in the plurality of resources.

15. The method of claim 8 enabling at least one alternative in which the length of one of the pair of address ranges is equivalent to the length of addresses assigned to resources on one communication side of the non-transparent bridge and the length of the of another one of the pair of address ranges is equivalent to the length of addresses assigned to resources on an opposite communication side of the non-transparent bridge.

16. A PCIe compliant network system for communicating information though components configured in a topology that includes multiple different paths between two switches, the PCIe compliant network system comprising:
   a plurality of switch devices coupled together to form a PCIe compliant tree topology with a plurality of branches;

a plurality of end point devices that are coupled to the ends of the plurality of branches; and a non-transparent bridge exposed to a first one of the plurality of switches by a first range of addresses assigned to the non-transparent bridge and exposed to a second one of the plurality of switches by a second range of addresses assigned to the non-transparent bridge, the non-transparent bridge communicating information in the PCIe compliant network between the first one of the plurality of switches and second one of the plurality of switches by translating a destination address within the first range of addresses assigned to the non-transparent bridge to a translated destination address associated with a resource coupled to the second one of the plurality of switches and translating a destination addresses within the second range of addresses assigned to the non-transparent bridge to a translated destination address associated with a resource coupled to the first one of the plurality of switches.

17. The PCIe compliant network system of claim 16, in which the non-transparent bridge circuit comprising:

a first network connection connected to the first one of the plurality of switches in a first one of the plurality of branches of the PCIe compliant network and a second network connection connected to a second one of the plurality of switches in a second one of the plurality of branches of the PCIe compliant network;

a processing circuit; and a memory that stores information for the processing circuit;

the processing circuit being configured to:

receive a data packet from the first one of the plurality of switches, the data packet includes a first payload portion and the destination address that is within the first range of addresses assigned to the non-transparent bridge;

generate a modified data packet based on results of the translating of the destination address within the first range of addresses, the modified data packet includes the first payload portion and the translated destination address associated with the resource coupled to the second one of the plurality of switches, the resource includes an end-point device; and forward the modified data packet to the second switch for delivery to the resource.

18. The PCIe compliant network system of claim 16, in which the first range of addresses and the second range of addresses are assigned by a master root complex circuit that coordinates address assignment to the plurality of switches, the plurality of end points and the non-transparent bridge.

19. The PCIe compliant network system of claim 16, in which the multiple different paths include transmission connections between the plurality of switches, the plurality of end point devices, and the non-transparent bridge to form a high-dimensional topology that is PCIe compliant.

20. The PCIe compliant network system of claim 16, in which the first range of addresses and the second range of addresses are a pair of address ranges that enable the non-transparent bridge to simulate a pair of end points.

21. The PCIe compliant network system of claim 16, in which an alternative path in the multiple different paths other than through the non-transparent bridge is established between the first one of the plurality of switches and the second one of the plurality of switches.

22. The PCIe compliant network system of claim 16, in which the PCIe compliant network system includes a first PCIe compliant network domain comprised of up to 256 nodes that include the first switch and a second PCIe compliant network domain comprised of up to 256 nodes that include the second switch, and the non-transparent bridge forwards the payload portion across a boundary of the first PCIe compliant network domain and the second PCIe compliant network domain in accordance with the translation of the first address to the second address.

* * * * *